United States Patent
Pegg et al.

(10) Patent No.: US 8,205,443 B2
(45) Date of Patent: Jun. 26, 2012

(54) HEAT EXCHANGING SYSTEMS FOR MOTOR VEHICLES

(75) Inventors: Ian Graham Pegg, Chelmsford (GB); Roland Stark, Herts (GB)

(73) Assignee: Ford Global Technologies LLC, Dearborn, MI (US)

( * ) Notice: Subject to any disclaimer, the term of this patent is extended or adjusted under 35 U.S.C. 154(b) by 113 days.

(21) Appl. No.: 12/818,820

(22) Filed: Jun. 18, 2010

(65) Prior Publication Data

US 2011/0000188 A1 Jan. 6, 2011

(30) Foreign Application Priority Data

Jul. 3, 2009 (GB) .................................. 0911520.5

(51) Int. Cl.
*F01N 3/02* (2006.01)

(52) U.S. Cl. ........... 60/320; 60/274; 60/278; 60/287; 60/298; 60/324; 60/602; 60/604; 60/605.2; 165/51; 165/52; 165/276

(58) Field of Classification Search .......... 60/274, 60/278, 284, 287, 292, 298, 320, 324, 602, 60/604, 605.2; 165/51, 52, 140, 276
See application file for complete search history.

(56) References Cited

U.S. PATENT DOCUMENTS

| 4,685,291 | A | * | 8/1987 | Ha ................................ | 60/286 |
| 4,685,430 | A | * | 8/1987 | Ap ......................... | 123/142.5 R |
| 4,756,359 | A | * | 7/1988 | Greer ............................. | 165/43 |
| 4,885,911 | A | * | 12/1989 | Woollenweber et al. ...... | 60/597 |
| 6,899,162 | B2 | * | 5/2005 | Hohl et al. ..................... | 165/41 |
| 7,043,914 | B2 | * | 5/2006 | Ishikawa ..................... | 60/605.2 |
| 7,246,487 | B2 | * | 7/2007 | Hara ............................. | 60/298 |
| 7,454,869 | B2 | * | 11/2008 | Owen ............................ | 52/263 |

FOREIGN PATENT DOCUMENTS

| EP | 1426602 A1 | 6/2004 |
| GB | 2381576 A | 5/2003 |
| WO | 2006135260 A1 | 12/2006 |

OTHER PUBLICATIONS

GB Search Report dated Oct. 14, 2009, pp. 1.

* cited by examiner

*Primary Examiner* — Binh Q Tran

(74) *Attorney, Agent, or Firm* — Julia Voutyras; Brooks Kushman P.C.

(57) ABSTRACT

A heat exchanging system suitable for use in an exhaust gas recirculation (EGR) circuit comprises a split EGR heat exchanger arrangement. Exhaust gas is used to warm engine oil via a first heat exchanger during initial stages of an engine operating cycle. In the later stages of the operating cycle, recirculated exhaust gases are diverted to flow through the second heat exchanger where they are cooled by the engine coolant.

19 Claims, 3 Drawing Sheets

HEAT EXCHANGING SYSTEMS FOR MOTOR VEHICLES

CROSS-REFERENCE TO RELATED APPLICATIONS

This application claims foreign priority benefits under 35 U.S.C. §119(a)-(d) to GB 0911520.5 filed Jul. 3, 2009, which is hereby incorporated by reference in its entirety.

BACKGROUND

1. Technical Field

This disclosure relates to heat exchanging systems for motor vehicles.

2. Background Art

Vehicle manufacturers are under pressure to improve the fuel consumption and emissions figures produced by standard drive cycle tests of their vehicles. Drive cycle tests, such as the European drive cycle (NEDC) start with the engine and transmission cold. Most journeys start with a cold engine and fuel consumption and exhaust emissions are worse for a cold powertrain than when it is at normal operating temperatures. From a cold start, the engine metal, coolant, engine oil, transmission oil, and exhaust treatment systems take a significant amount of time to warm up. These components are consequently not operating at their optimum temperatures for a significant portion of the drive cycle and this has a detrimental effect on fuel economy and emissions.

During cold start or early warm-up operation, the engine will not require any cooling. To reach maximum fuel efficiency in the shortest possible time, it is advantageous to provide for heating lubricants, such as the engine oil and transmission oil, up to some optimum temperature.

GB-A-2429763 discloses a vehicle system in which heat from exhaust gases is used to warm coolant which, in turn, is used to warm the engine oil.

It is also known for a vehicle to have an exhaust gas recirculation (EGR) system. See, for example, US2006/0005791. Therein is described a cooling system whereby an engine coolant circulates through an exhaust gas heat exchanger for the purposes of cooling exhaust gases prior to diverting the gases to the inlet manifold of the engine.

Engine oil warms up slowly in internal combustion engines, leading to higher friction due to higher viscosity of the oil, especially from ambient temperatures starts. In known systems oil temperature is initially linked to coolant temperature and coolant is more effective at cooling when cold than when the engine is hot. A water-cooled EGR system will also stay cold during the early stages of a drive cycle unless a bypass is fitted. Cold EGR gas tends to cause higher levels of carbon monoxide and hydrocarbons than is desirable.

SUMMARY

A heat exchanging system for a motor vehicle having an internal combustion engine and an exhaust system is disclosed which includes first and second exhaust gas heat exchangers connected in parallel: the first for exchanging heat between exhaust gas and engine oil; and the second for exchanging heat between exhaust gas and a circulating liquid coolant. A valve arrangement regulates the flow of exhaust gases between the two heat exchangers.

The valve arrangement may include a diverter valve. Alternatively, the valve arrangement includes a first valve for controlling exhaust gas flow through the first exhaust gas heat exchanger and a second valve for controlling exhaust gas flow through the second exhaust gas heater exchanger.

The heat exchanging system may form a part of an exhaust gas recirculation (EGR) system. In such a case, the first and second valves may be conventional EGR valves. Alternatively, the diverter valve can be employed in conjunction with an EGR valve for regulating the flow of EGR gas into the engine's intake manifold.

If the exhaust gas heat exchangers are the types which are effective only when there is a flow of gas through them, then it makes no difference whether the valves are located on the exhaust side or intake side of the engine.

The liquid coolant may be engine coolant which flows through the engine and a conventional radiator. Alternatively, the liquid coolant may flow through a circuit which is separate from the engine cooling system. In embodiments in which the liquid coolant is water one or more additives, such as antifreeze or corrosion inhibitor, may be blended into the water.

In some embodiments, the engine oil is guided round a circuit which includes a pump for forcing oil through the first heat exchanger at a variable rate, which is independent of engine speed. Such a pump may be of the type whose speed can be varied electrically. Alternatively, it may be a mechanically driven pump whose flow rate is altered by electrically and hydraulically varying its displacement. The oil circuit may also include a water-cooled oil cooler, an oil cooler bypass link, and a valve.

Coolant flow through the second exhaust gas heat exchanger may be controlled by a valve arrangement.

According to embodiments of the disclosure, energy is extracted from EGR gas to varying degrees to suit EGR cooling requirements and to use EGR gas heat during the early stages of the drive cycle to warm engine oil. The arrangement allows coolant temperature and oil temperature to be independent of one another in contrast to known systems where they are extensively coupled. Such an arrangement has the advantage of lowering CO, HC, and NOx emissions and reducing oil friction thereby leading to lower fuel consumption.

BRIEF DESCRIPTION OF THE DRAWINGS

Some embodiments of the disclosure will now be described, by way of example only, with reference to the drawings of which.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
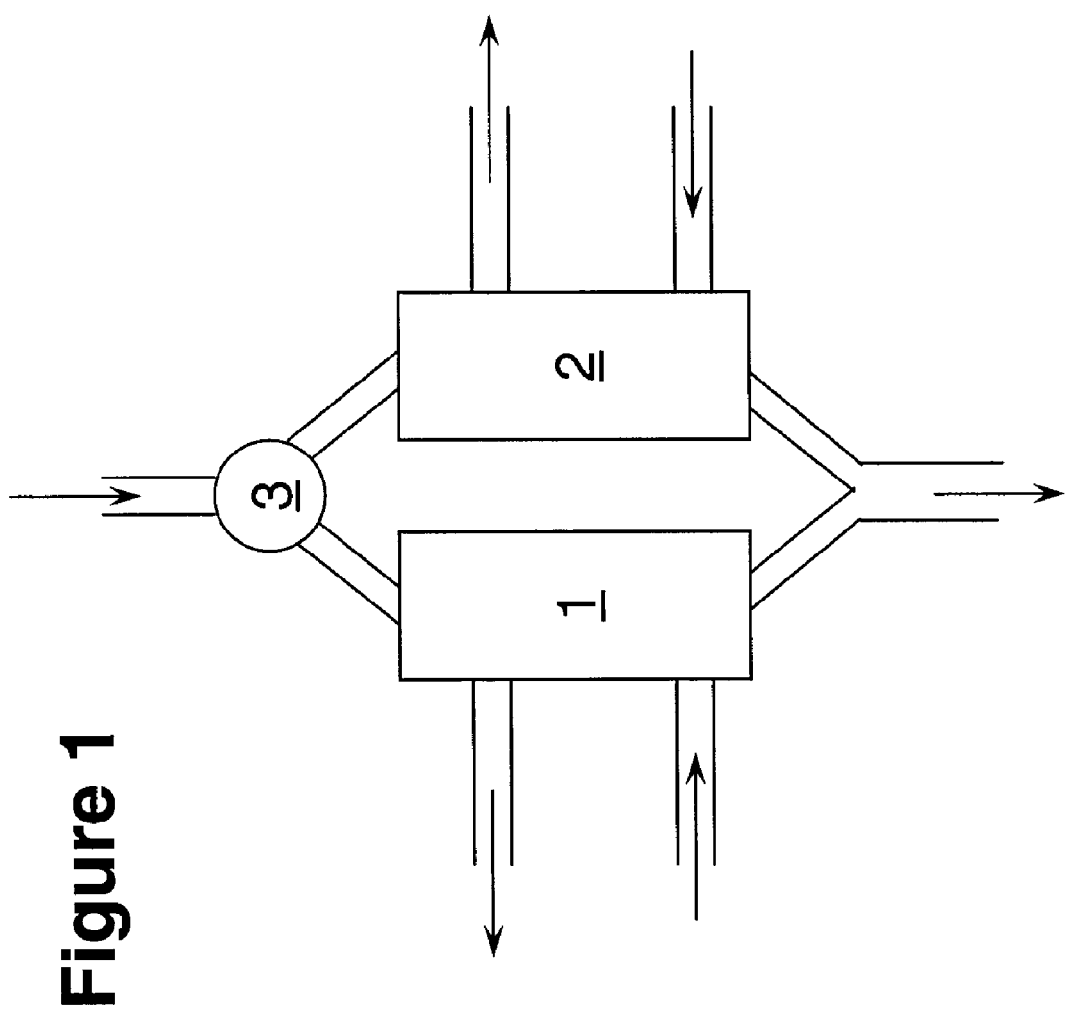
FIG. 1 is a schematic block diagram of a heat exchanging system in accordance with a first embodiment of the disclosure.
Figure 2:
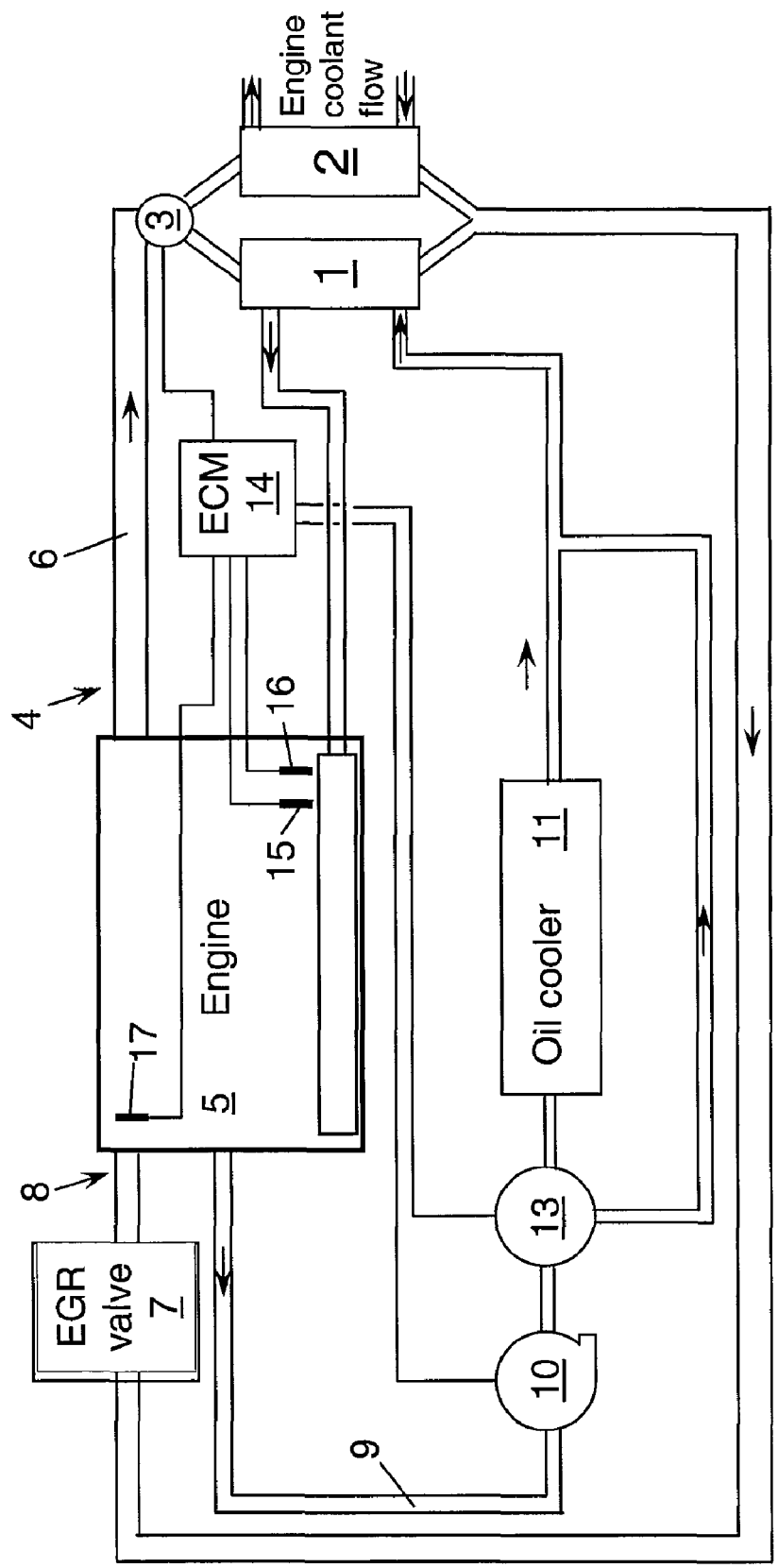
FIG. 2 is a schematic block diagram of the system of FIG. 1 incorporated into an EGR and engine oil circuit.

With reference to FIGS. 1 and 2, a heat exchanging system comprises two exhaust gas heat exchangers 1, 2 and a diverter valve 3. In this specific example, the system is part of an exhaust gas recirculation (EGR) system to which this disclosure has particularly advantageous application. Exhaust gas from an exhaust manifold region 4 of an engine 5 is channeled via a conduit 6 through the system and then fed back to the engine 5 via an EGR valve 7 to an intake manifold region 8. The two heat exchangers 1, 2, are connected in parallel so that exhaust gases may pass through one or both exchangers (depending on the setting of the diverter valve 3) and then recombine on their exit from the exchangers. The EGR valve 7 controls EGR gas flow into the intake 8.

The first heat exchanger 1 has a conduit for allowing engine oil to flow through, thereby permitting heat to be exchanged between the oil and the EGR gas.

The second exchanger 2 has a conduit for allowing engine coolant to flow through, thereby permitting heat to be exchanged between the coolant and the EGR gas. In this example, the coolant is composed predominantly of water and circulates through the engine 5 and other conventional cooling system components (not shown).

In the embodiment in FIG. 2, the direction of flow of the oil and coolant opposes that of the EGR gas, i.e., a counterflow arrangement. This permits high heat exchange efficiency. Alternatively, a parallel flow arrangement can be used, for example to improve packaging. Engine oil flows from the engine 5 to the first heat exchanger 1 via an oil circuit 9 which includes: a variable flow oil pump 10, a water-cooled oil cooler 11, an oil cooler bypass link 12 and a bypass valve 13.

The oil pump 10, bypass valve 13, EGR valve 7 and diverter valve 3 are electrically linked to and controlled by an electronic control module (ECM) 14. The module 14 receives inputs from an engine oil pressure sensor 15, an engine oil temperature sensor 16 located near the main oil gallery of the engine 5, and an EGR gas temperature sensor 17 located near the intake region 8.

According to some embodiments, when the engine 5 is started up cold, to cause engine oil and EGR to reach their optimum operating temperatures rapidly, ECM 14 detects, via the engine oil temperature sensor 16, that the oil is cold and therefore fairly viscous and resists flowing. The ECM 14 also monitors the oil pressure via the oil pressure sensor 15. The ECM 14 adjusts the speed of the oil pump 10 so that a desired pressure is maintained. In this initial phase, the ECM 14 also sets the bypass valve 13 so that oil is diverted through the bypass link 12, avoiding the cooler 11, so that oil is warmed rather than cooled at this stage.

On start-up, EGR gas requires no cooling either. Therefore, the ECM 14 sets the diverter valve 3 so that all the exhaust gas circulating through the conduit 6 is directed through the first heat exchanger 1. Hence exhaust gases assist the oil in reaching optimal operating temperature more rapidly. The oil does not cause appreciable cooling of the EGR gas, at least compared with the cooling effect of the engine coolant circulating through the second heat exchanger 2. This is because the oil flow rate is typically half that of the water flow rate.

In some embodiments an electrically-controlled oil pump 10 is used so that the speed of the oil pump 10 can be controlled independently of engine speed. In other embodiments, a mechanical pump, whose speed is dictated by engine speed, is used. With a mechanical pump, the oil flow rate is higher than desirable to maintain a desired oil pressure. By adjusting the speed of the electric pump 10, the flow rate can be set relatively low so that the oil lingers in the heat exchanger 2. Thereby, the oil has more time to heat up before reaching the critical moving components in the engine. A higher oil flow rate also leads to higher EGR gas cooling, which is not needed in the initial stages of the drive cycle. The closer the heat exchanger system can be placed to the engine oil galleries the better. This ensures that warmed oil quickly gets to the critical moving parts of the engine, rather than circulating through the sump or engine block first. This prevents dissipating some of its energy in the process.

In the intermediate stage of the drive cycle, the engine oil is now approaching its optimum operating temperature and a modest amount of EGR cooling is desired. The ECM 14 continues to monitor the outputs of the sensors 15, 16, 17 and adjusts the oil pump 10 speed so that the desired pressure is maintained. The flow rate is increased to maintain pressure required by the critical components.

The ECM 14 now sets the diverter valve 3 so that a small proportion of EGR gas flows through the second heat exchanger 2. This permits some cooling of EGR gas by engine coolant. The greater portion of EGR gas continues to flow through the first heat exchanger 1.

In a final part of the drive cycle, the EGR gas requires maximum cooling and the oil ceases to require any heating. Therefore, the ECM 14 sets the diverter valve 3 so that all EGR gas flows through the second heater exchanger 2. In addition, the ECM 14 sets the bypass valve 13 so that at least a proportion of engine oil flows through the oil cooler 11 to maintain oil temperature within an appropriate range.

It can be seen that the heating requirements of the oil and the cooling requirements of the EGR gas complement one another throughout the stages from switch-on to steady-state running conditions. The split EGR heating exchanging system enables both requirements to be satisfied simultaneously.

In an alternative mode of operation of the final part of the drive cycle, a small percentage of EGR gas is diverted to flow through the first heat exchanger. This helps to maintain an optimum oil temperature at light engine loads.

During each part of the drive cycle, the ECM 14 controls the volume flow of EGR gas into the engine intake 8 by adjusting the EGR valve 7 in a conventional manner.

Figure 3:
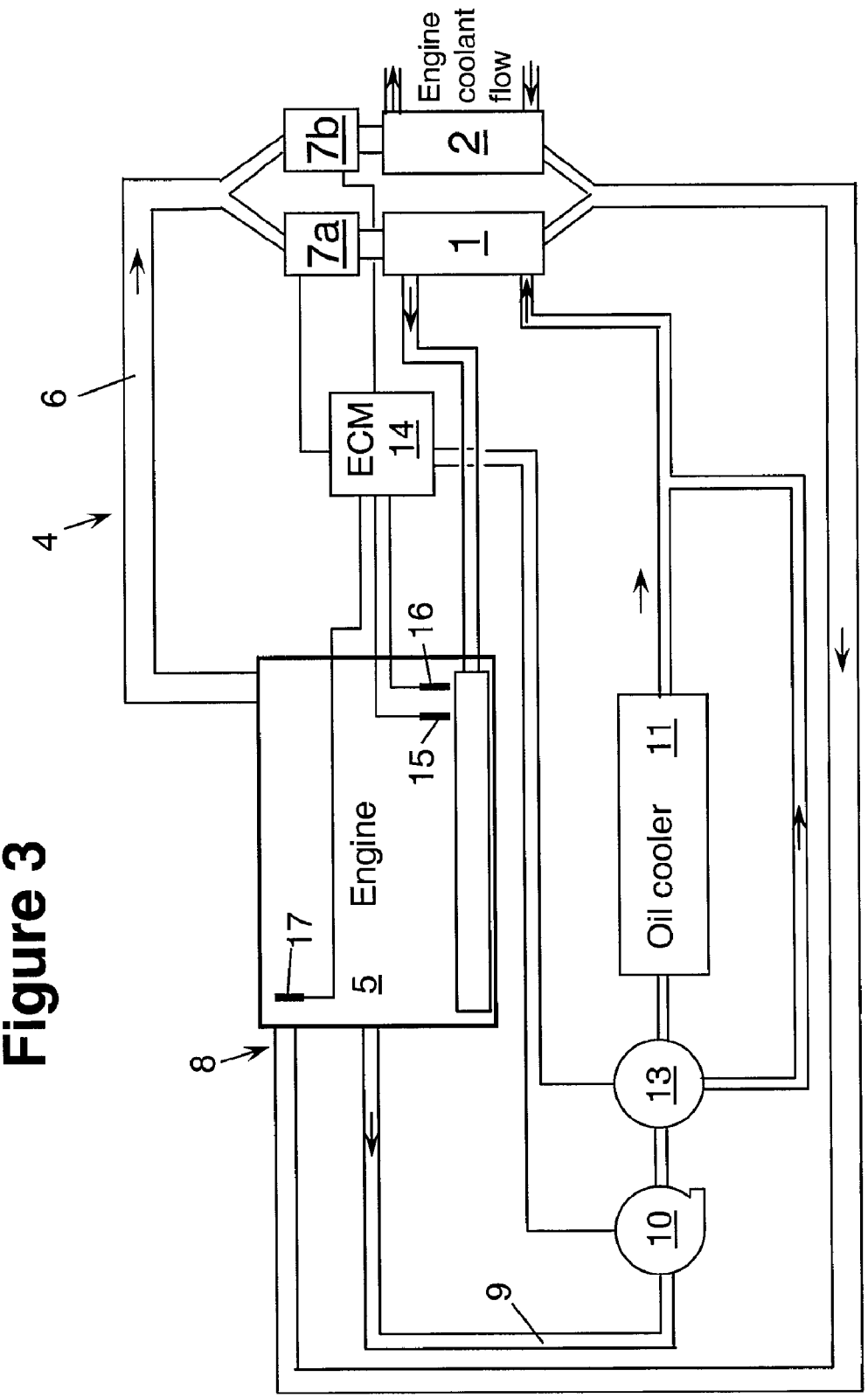
FIG. 3 is a schematic block diagram of a second embodiment of a heat exchanging system incorporated into a EGR and engine oil circuit.

The embodiment of FIG. 3 operates in a similar manner to that of FIG. 2. The components of each embodiment are identical except for a few differences as follows. Instead of the provision of a diverter valve 3 and an EGR valve 7 (as shown in FIG. 2), the embodiment of FIG. 3 is provided with two EGR valves 7a, 7b, one in each branch of the conduit 6 which diverts exhaust gas through each heat exchanger 1 and 2, respectively. The EGR valves 7a, 7b, are controlled by the ECM 14.

The EGR valves 7a, 7b serve to control the volume of EGR gas fed back to the intake 8 and also to selectively control the quantity of EGR gas through the heat exchangers 1 and 2.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. For example, it may be desirable to have an extensive set of sensors to provide an accurate assessment of the state of vehicle accessories. The embodiments described as being less desirable relative to other embodiments with respect to one or more characteristics are not outside the scope of the disclosure as claimed.

What is claimed:

1. A heat exchanging system for a motor vehicle having an internal combustion engine and an exhaust system, the heat exchanging system comprising:

first and second exhaust gas heat exchangers connected in parallel, the first for exchanging heat between exhaust gas and engine oil and the second for exchanging heat between exhaust gas and a circulating liquid coolant; and a valve arrangement for regulating the flow of exhaust gases between the two heat exchangers.

2. A heat exchanging system according to claim 1, further comprising:

an oil pump for forcing engine oil through the first heat exchanger at a variable rate which is independent of engine speed.

3. A heat exchanging system according to claim 1, further comprising:

a water-cooled oil cooler and associated bypass link and bypass valve.

4. A heat exchanging system according to claim 2, further comprising:

a water-cooled oil cooler;
a bypass link in parallel with the oil cooler;
a bypass valve adapted to control flow to the water-cooled oil cooler and the bypass link;
engine sensors; and
an electronic control module electrically coupled to the valve arrangement, the oil pump, the bypass valve, and the engine sensors for controlling the action of the valve arrangement, the oil pump and the bypass valve in response to signals from the engine sensors.

5. The heat exchanging system according to claim 1 wherein the valve arrangement comprises:

a diverter valve having a single inlet and two outlets with one of the two outlets coupled to the first exhaust gas heat exchanger and the second outlet coupled to the second exhaust gas heat exchanger.

6. The heat exchanging system according to claim 1 wherein the valve arrangement comprises:

a first EGR valve coupled to the first exhaust gas heat exchanger; and
a second EGR valve coupled to the second exhaust gas heat exchanger.

7. The heat exchanging system according to claim 6, further comprising:

an upstream connecting conduit having one inlet and first and second outlets with the first outlet coupled to the first EGR valve at a location upstream of the first EGR valve and the second outlet coupled to the second EGR valve at a location upstream of the second EGR valve; and
a downstream connecting conduit having first and second inlets and one outlet with the first inlet coupled to the first EGR valve at a location downstream of the first EGR valve and the second inlet coupled to the second EGR valve at a location downstream of the second EGR valve.

8. The heat exchanging system according to claim 6 wherein the first EGR valve is located upstream of the first exhaust gas heat exchanger and the second EGR valve is located upstream of the second exhaust gas heat exchanger.

9. The heat exchanging system according to claim 6 wherein the second EGR valve is located downstream of the second exhaust gas heat exchanger.

10. A method to control an EGR heat exchanging system coupled to an engine wherein the system comprises first and second EGR heat exchangers in parallel, comprising:

diverting EGR flow through the first heat exchanger in response to a determination that the engine is starting cold; and
controlling EGR flow to the first and second heat exchangers in response to engine oil achieving a predetermined operating temperature wherein the EGR flow is controlled to provide a desired level of cooling to EGR gas in the second heat exchanger.

11. The method of claim 10, further comprising:

diverting EGR flow through the second heat exchanger in response to a determination that EGR cooling is desired.

12. The method of claim 10, further comprising:

diverting EGR flow through the second heat exchanger in response to a determination that engine oil temperature exceeds a temperature at which additional heating is desired.

13. The method of claim 10 wherein an electrically-controlled oil pump is disposed in an oil circuit of the engine and the first EGR heat exchanger is a component in the oil circuit of the engine, the method further comprising:

controlling pump speed to the minimum speed to maintain a desired pressure in the oil circuit.

14. The method of claim 10, wherein an oil cooler, a bypass to the oil cooler, and a bypass valve are further provided in an oil circuit of the engine, the method further comprising:

commanding the bypass valve to direct substantially all the oil to flow through the bypass in response to engine oil having achieved a predetermined operating temperature and engine oil temperature less than a predetermined optimal temperature.

15. The method of claim 12, wherein an oil cooler, a bypass to the oil cooler, and a bypass valve are further provided in the oil circuit of the engine, the method further comprising:

commanding the bypass valve to direct substantially all the oil to flow through the oil cooler in response to the determination that engine oil temperature exceeds a temperature at which additional heating is desired.

16. An EGR heat exchanging system for an internal combustion engine, the heat exchanging system comprising:

a first EGR heat exchanger exchanging heat between EGR and engine oil;
a second EGR heat exchanger arranged in parallel with the first EGR heat exchanger and exchanging heat between EGR and liquid coolant; and
a valve for regulating flow of exhaust gases into the heat exchangers.

17. The system of claim 16 wherein the liquid coolant is engine coolant.

18. The system of claim 16, further comprising:

an engine oil temperature sensor;
an EGR gas temperature sensor; and
an electronic control module coupled to the engine oil temperature sensor, the EGR gas temperature sensor, and the valve wherein the electronic control module commands the valve based on signals from the engine oil temperature sensor and the EGR gas temperature sensor.

19. The system of claim 16, wherein the valve is a first valve coupled proximate the first EGR heat exchanger, the system further comprising:

second valve coupled proximate the second EGR heat exchanger;
a plurality of engine sensors; and
an electronic control module coupled to the plurality of engine sensors and the valve wherein the electronic control module commands the valve based on signals from an engine oil temperature sensor and an EGR gas temperature sensor.

* * * * *